United States Patent
Cheng et al.

(10) Patent No.: US 8,291,024 B1
(45) Date of Patent: Oct. 16, 2012

(54) STATISTICAL SPAMMING BEHAVIOR ANALYSIS ON MAIL CLUSTERS

(75) Inventors: Yun-Chian Cheng, Merced, CA (US); Allen Ming-Tai Chang, Xizhi (TW)

(73) Assignee: Trend Micro Incorporated, Tokyo (JP)

( * ) Notice: Subject to any disclaimer, the term of this patent is extended or adjusted under 35 U.S.C. 154(b) by 205 days.

(21) Appl. No.: 12/184,074

(22) Filed: Jul. 31, 2008

(51) Int. Cl.
*G06F 15/16* (2006.01)

(52) U.S. Cl. .......................... 709/206; 709/207; 709/225

(58) Field of Classification Search ................... 709/206
See application file for complete search history.

(56) References Cited

U.S. PATENT DOCUMENTS

| | | | | |
|---|---|---|---|---|
| 2003/0195937 A1* | 10/2003 | Kircher et al. | ................ | 709/207 |
| 2004/0148330 A1* | 7/2004 | Alspector et al. | ............. | 709/200 |
| 2005/0203800 A1* | 9/2005 | Sweeney et al. | ................ | 705/14 |
| 2006/0168006 A1* | 7/2006 | Shannon et al. | ............. | 709/206 |
| 2006/0168032 A1* | 7/2006 | Cai et al. | ....................... | 709/206 |
| 2006/0271631 A1* | 11/2006 | Qureshi et al. | ................ | 709/206 |
| 2006/0277259 A1* | 12/2006 | Murphy et al. | ............... | 709/206 |
| 2007/0053510 A1* | 3/2007 | Rosati et al. | .................... | 380/30 |
| 2007/0208856 A1* | 9/2007 | Rounthwaite et al. | ........ | 709/225 |
| 2008/0086555 A1* | 4/2008 | Feinleib | ........................ | 709/224 |
| 2008/0104184 A1* | 5/2008 | Wilson et al. | ................. | 709/206 |
| 2008/0114843 A1* | 5/2008 | Shinde et al. | ................. | 709/206 |
| 2008/0141332 A1* | 6/2008 | Treinen | ............................ | 726/1 |
| 2008/0319995 A1* | 12/2008 | Alspector et al. | ................. | 707/6 |
| 2009/0070872 A1* | 3/2009 | Cowings et al. | ............. | 726/23 |
| 2009/0077617 A1* | 3/2009 | Levow et al. | ..................... | 726/1 |
| 2009/0089244 A1* | 4/2009 | Donato et al. | .................... | 707/3 |
| 2009/0089285 A1* | 4/2009 | Donato et al. | .................... | 707/6 |
| 2009/0234924 A1* | 9/2009 | Edelen et al. | ................. | 709/206 |
| 2009/0307313 A1* | 12/2009 | Wang et al. | .................... | 709/206 |
| 2010/0118717 A1* | 5/2010 | Suzuki et al. | ................. | 370/252 |

* cited by examiner

*Primary Examiner* — Firmin Backer
*Assistant Examiner* — Hamza Algibhah
(74) *Attorney, Agent, or Firm* — Beyer Law Group LLP (57) ABSTRACT

A clustering technique is utilized to group similar e-mail messages into clusters. Statistical spamming behavior analysis is then applied to each cluster, focusing on finding e-mail messages within each cluster that differ from other e-mail messages in the cluster. The degree of variance and the type of variance can provide important clues as to whether the email is spam or not. Appropriate measures are then taken to block, filter, or otherwise handle the suspected spam e-mail messages.

21 Claims, 5 Drawing Sheets

STATISTICAL SPAMMING BEHAVIOR ANALYSIS ON MAIL CLUSTERS

FIELD OF THE INVENTION

The present invention relates generally to electronic mail (e-mail). More specifically, the present invention relates to the performing of statistical spamming behavior analysis on mail clusters.

BACKGROUND OF THE INVENTION

E-mail has grown from a niche product to a primary means of communication in a relatively short period of time. Along with this massive rise in popularity, however, e-mail has also spawned a cottage industry of spamming, phishing, and other malicious or annoying communications. Spam is generally unsolicited commercial advertising. E-mail spam, also known as bulk or junk e-mail, is a subset of spam that involves sending nearly identical messages to numerous recipients by e-mail. In general, e-mail spamming is the abuse of electronic messaging systems to indiscriminately send unsolicited, unwanted or annoying bulk messages.

While spam generally wastes time and can be annoying, for the most part it does not cause direct financial harm to the recipient (although the resources that spam utilizes can indirectly cost money, such as, for example, bandwidth costs rising). There are other types of communications which are more malicious. These include communications with viruses or worms, as well as so called "phishing" attacks. A phishing attack is one where the sender is posing as a legitimate sender in order to entice the recipient to respond with personal information that could then be used to steal money. For example, a phishing attack may include a communication purportedly from a bank requesting that the recipient enter his bank account information in order to correct a problem or access a service. Upon transmission of the account information, the user's bank account is cleaned out by the malicious initiator of the attack.

There have been many attempts to filter e-mail messages in order to reduce or eliminate malicious or annoying messages, but none has been totally satisfactory. One method is to simply provide the user with the ability to mark certain senders as being on a "blocked" list. E-mail messages from senders on the "blocked" list then are blocked prior to being read by the user. This method can also be modified to search for certain terms or phrases in the subject or body of the email, and to block corresponding e-mail messages with matching terms or phrases. These methods suffer from the disadvantage, however, of requiring user interaction in order to set up and update the settings. Additionally, many savvy malicious senders have learned to modify the source addresses of their communications or to make minor modifications to the texts of the subjects or bodies of email so that each email is unique, making it difficult to block repeated e-mail messages.

Other approaches have involved setting up block lists more centrally, such as on an email server. Email is transmitted from one user to another through one or more email servers, which receive and direct the e-mail messages. While utilizing block lists on email servers shifts the burden of setting up and maintaining the lists to service providers or companies, these block lists can still be fooled by savvy senders.

Another approach is to verify the authenticity of an email using some sort of security system. Common such systems include certificates or key-based systems. This approach, however, requires that the sender of the email transmit a certificate with the email or utilize one or more security keys when generating or sending the email. This can be a complicated process and most individual users do not have the ability to perform such complicated email algorithms prior to sending an email. This approach also adds processing time to the processing of the e-mail messages, as the certificates or keys must be read and verified.

Considering these previous approaches and their disadvantages, an email filtering system is desired that would be more effective than prior art techniques.

SUMMARY OF THE INVENTION

In an embodiment of the present invention, a clustering technique is utilized to group similar e-mail messages into clusters. Statistical spamming behavior analysis is then applied to each cluster, focusing on finding e-mail messages within each cluster that differ from other e-mail messages in the cluster. The degree of variance and the type of variance can provide important clues as to whether the email is spam or not. Appropriate measures are then taken to block, filter, or otherwise handle the suspected spam e-mail messages.

The present invention has a variety of applications. In one application, the analysis output helps anti-spam developers effectively and efficiently study spam e-mail messages and corresponding features and subsequently generate appropriate filtering techniques.

In a first embodiment, a spamming behavior analysis system is implemented in conjunction with e-mail client software, and may be incorporated within that software or may work side-by-side with it.

In a second embodiment, a spamming behavior analysis system is implemented in conjunction with an e-mail server, and may be incorporated within that server software or may work side-by-side with it.

In a third embodiment, information regarding clusters is shared between devices on a network. For example, if analysis of the e-mail clusters is performed at the e-mail server, the e-mail server may share this information with any of a number of e-mail client software on user's computers. This information may include the common trait shared by e-mail messages in the cluster, the differences in the feature data for that particular cluster, the results from the statistical spamming analysis module, the final spam probability rating for cluster, etc. Other devices with which this information may be shared include other email servers.

In a fourth embodiment, a statistical analysis is performed upon different features of e-mail messages in a cluster in parallel, in order to determine a single probability that each cluster contains spam. In a variation, statistical analysis of each feature is performed separately to determine a spam probability rating. These ratings may then be combined.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Overview

A clustering technique is utilized to group similar e-mail messages into clusters. Statistical spamming behavior analysis is then applied to each cluster, focusing on finding e-mail messages within each cluster that differ from other e-mail messages in the cluster. The degree of variance and the type of variance can provide important clues as to whether the email is spam or not. Appropriate measures are then taken to block, filter, or otherwise handle the suspected spam e-mail messages.

In one embodiment of the present invention, the email communications subject to the processes described in this document are from a real-time email stream from sourcing channels such as spam honeynet (a type of trap set up to detect, deflect, or in some manner counteract attempts at unauthorized use of information systems) or enterprise Simple Mail Transport Protocol (SMTP) traffic. Other examples of real-time email streams include E-mail hosting services, such as Yahoo mail, Google mail, and Hotmail.

Clustering is the classification of objects into different groups. More precisely, clustering involves the partitioning of an object set into subjects (clusters) so that the objects in each subset share some common trait or feature. In the context of the present invention, the "objects" are email messages and the "common trait or feature" is the common longest possible text or phrases. In other words, document clustering technology is used to group email messages with nearly identical content.

The output of the mail clustering is a set of email clusters along with mail-related information such as sender domain/account, message subject, sender IPv4 address, and content uniform resource locators (URLs). Among these mail clusters there are clusters that contain normal or legitimate mail, clusters that contain spam, and clusters that are gray (e-mail messages that are not easy to classify as spam or not). The challenge is determining which clusters are which.

There are at least four spamming behaviors that can be analyzed on a given email cluster to aid in determining whether the cluster contains spam email. Each spamming behavior is indicated by a specific feature. The statistics of the feature data of all the e-mail messages in a given cluster are computed to find out the degree of difference of the feature data. The degree of difference of the feature data is then compared with that of legitimate mail clusters to determine if the feature data rises to the level of spamming behavior.

The first of the four spamming behaviors is based upon sender domain/account statistics. In legitimate email clusters, the sender domains are almost always identical or with very small differences. In contrast, spam email clusters have a greater degree of difference in sender domains in order to bypass common spam filters that use black list or similar spam blocking techniques. For example, if ten thousand identical e-mail messages are sent from the exact same domain (e.g., washingtonmutual.com), it is less likely that the e-mail messages are spam because spammers generally alter the domain (even slightly) from email to email. In the example above, it is more likely that washingtonmutual.com is simply sending out a legitimate newsletter or alert rather than sending spam. If on the other hand there are e-mail messages within the cluster from different domains, it makes it more likely the cluster is filled with spam. Sender account statistics can also be used in the case of a single unique sender domain found in a given mail cluster.

The precise amount of dissimilarity "permitted" from domain to domain can be set by an administrator. Given the common traits of legitimate e-mail messages, however, it is likely that an administrator will want to set the threshold for violation of similarity of domain very low (i.e., any small variance will be tagged as potential spam). The numerical statistic for sender domains in a cluster is simply computed by counting the number of unique domains. In an identified cluster, the greater the number of unique domains is, the greater the variance is, and then the greater the spam probability is. The number of unique sender domains is then used to obtain the rating score by comparing with a numeric threshold. In an extreme case, only one unique sender domain gets '0' rating score since this is legitimate behavior. A configurable numeric threshold is then set to distinguish legitimate and spamming behavior while preserving some gray area. Any number below the threshold will get 0 rating score. Numbers above or equal to the threshold get positive rating score.

The second of the four spamming behaviors is based upon mail subject statistics. In legitimate mail clusters, the subjects of the e-mail messages are typically identical. In contrast, spam email clusters tend to have a great degree of difference in message subjects in order to bypass spam filtering techniques that utilize signature or keyword matching. Many subject lines in spam e-mail messages have a simple variance of certain characters, such as "he11o" or "hell0 instead of "hello," or "v1agra" or "viagr@ " instead of "viagra."

Once again, the precise amount of dissimilarity "permitted" from subject to subject can be set by an administrator. Also once again, given the common traits of legitimate e-mail messages, it is likely that an administrator will want to set the threshold for violation of similarity of subjects fairly low. The numerical statistic for subjects in a cluster is simply computed by counting the number of unique subjects. In an identified cluster, the greater the number of unique subjects is, the greater the variance is, and then the greater the spam probability is. The number of unique subjects is then used to obtain the rating score by comparing with a numeric threshold. In an extreme case, only one unique subject gets '0' rating score since this is legitimate behavior. A configurable numeric threshold is then set to distinguish legitimate and spamming behavior while preserving some gray area. Any number below the threshold will get 0 rating score. Numbers above or equal to the threshold get positive rating score.

The third of the four spamming behaviors is based upon sender IPv4 address statistics. Presently, most spam e-mail messages are sent from botnet. Botnet is a term for a collection of software robots (or bots) that run autonomously and automatically. They run on groups of compromised computers called zombie computers controlled remotely. While the term "botnet" can be used to refer to any group of bots, such as IRC bots, the word is generally used to refer to a collection of compromised computers running programs, usually installed via worms, Trojan horses, or backdoors, under a common command and control infrastructure.

Because most spam is sent from botnet, there is typically a large degree of difference in the sender IPv4 addresses in such messages. Legitimate e-mail messages in a cluster typically come from few, or even one, IPv4 address since legitimate email senders typically have their own designated outgoing mail server(s) to transfer e-mail messages. The main purpose of this statistics is to find out the variance of sender geographical location distribution. We use both the sender IPv4 address and the corresponding country code (the location) to obtain the statistic. The configurable threshold for the country code is 3, meaning that if the mails in a cluster were sent from more than 3 countries, then the mails were very likely sent from spam bots, i.e. they were spam. For the IPv4 addresses, we can simply count the number of unique IPv4 addresses or count the number of unique IPv4 subnets (CIDR—Classless Inter-Domain Routing) in a cluster. The IPv4 addresses within the same subnet (have the same CIDR) are owned by some organization. In the legitimate cluster, the number of unique subnets (CIDR numbers) should be 1 or 2.

The fourth of the four spamming behaviors is based upon content URL statistics. As web threats get more popular, more and more spam e-mail messages contain URLs in their messages in order to trick receivers into clicking them. Such URL tricks are very common in phishing techniques, wherein the sender is attempting to get the user to unknowingly provide sensitive information (such as social security numbers, bank account numbers, user names, or passwords) by fooling the user into thinking that he or she is providing information to a legitimate web site (typically one where the user has a preexisting relationship such that the request for information does not appear suspicious). URL tricks are also very common in spreading viruses, worms, or adware. Most email programs now are designed to block e-mail messages that automatically execute software programs, which could be used to install viruses, worms, or adware. However, most email programs still permit users to click on links embedded in e-mail messages that take them to web sites that automatically download such malicious programs on the user's computer (either completely surreptitiously or with the user's accidental consent by clicking on an "OK" button the user believes is for a different purpose).

Spam prevention techniques now include URL filtering techniques. In order to bypass these filters, spammers use a great number of different URLs to increase the odds of a successful attack. Consequently, the degree of difference in content URL in spam email clusters tends to be larger than those of legitimate email clusters. All the fully qualified domain names (FQDN) are extracted from the content URLs and compute the number of unique FQDNs in a cluster. In a legitimate cluster the number of unique FQDNs tends to be small, mostly less than 4. Anything greater than 3 (this number is therefore the configurable threshold) is considered large difference; hence it is the spamming behavior.

In one embodiment of the present invention, the output of the above spamming behavior analysis is a list of mail clusters tagged with three levels of spam possibility: low, medium, and high. A simple score ranking mechanism can be used with these ratings. Each spamming behavior feature is assigned a ranking score depending upon the importance of the given feature. As such, the features are "weighted" based on their importance. The ranking score of a given mail cluster is then computed by summing the ranking scores of the four analysis statistics. The higher the ranking score, the higher the spam possibility for the mail cluster.

System Diagram

Generally speaking, the clustering and spam behavior analysis may be performed at any of various levels in the hierarchy of a computer network. Some of these examples will be illustrated in this section. It should also be noted, however, that there is no requirement that both the clustering and spam behavior analysis be performed on or by the same device—there may be different devices devoted to each function. However, for simplicity, in this section both the clustering and spam behavior analysis are depicted as being performed by the same device.

Figure 1:
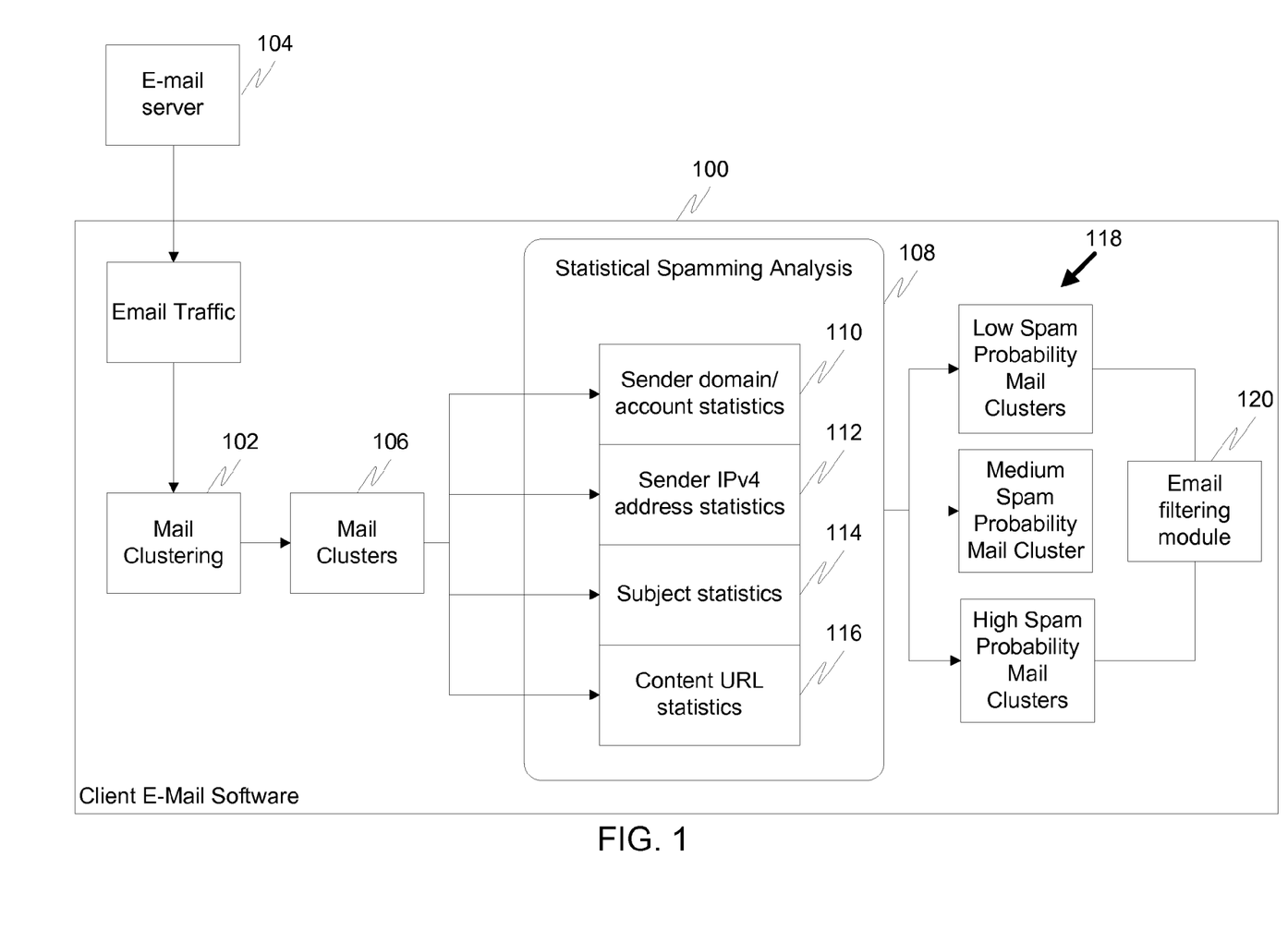
FIG. 1 is a diagram illustrating a system for statistic behavior analysis on mail clusters in accordance with a first embodiment of the present invention.

FIG. 1 is a diagram illustrating a system for statistic behavior analysis on mail clusters in accordance with a first embodiment of the present invention. In this embodiment, email clustering and statistical behavior analysis are performed at or with client mail software 100. An example of client email software 100 is Microsoft Outlook or Novel Groupwise. Included with or running in conjunction with client mail software 100 is a mail clustering module 102 that is designed to cluster real-time email streams arriving at the client mail software 100 from mail server 104. The output from this mail clustering module 102 is a group of mail clusters 106. These mail clusters may take many forms. In one embodiment of the present invention, the actual e-mail messages themselves are left out of the clusters, allowing the clusters to contain only the relevant features from the e-mail messages (e.g., sender domain/account statistics, sender IPv4 address statistics, subject statistics, and content URL statistics). The mail clustering is performed using 3 functions:

1. Parse mail body to extract mail features in interest (image, text, html tags), for example, if we have mail body contains solely text, then we extract text phrases by using natural language processing (NLP) techniques as features.

2. Apply those extracted features with machine learning algorithms, such as text string alignment algorithms, to group mails with the one or more common features, for example: having one or more same text phrases.

3. Those identified mail clusters are outputted for statistical analysis along with their properties (sender domain, IP, subject, content URL) and common features.

The information of a mail cluster can be well described by XML (eXtensible Markup Language) and its sample format is as follows:

```
<?xml version="1.0" encoding="UTF-8" ?>
<clusters count="{number of identified clusters}">
    <cluster id="{unique cluster identifier}">
    <features>{common cluster feature(s)}</features>
    <mails count="{number of mails in this cluster}">
        <mail id="{unique mail identifier}" type="mail content type">
            <from>{sender account and domain}</from>
            <subject>{mail subject}</subject>
            <ip>{sender IPv4 address and country code}</ip>
            <url>{content URLs}</url>
        </mail>
        <!--more mail information if any-->
    </mails>
```

```
<rank>{ranking result of this cluster: high, medium, or
    low}</rank>
  </cluster>
  <!--more cluster information if any-->
</clusters>]
```

The mail clusters 106 are then passed to a statistical spamming analysis module 108. This module 108 performs four feature analyses to determine the likelihood that each cluster is spam. The first is sender domain/account statistic analysis 110. The second is sender IPv4 address statistic analysis 112. The third is subject statistic analysis 114. The fourth is content URL statistic analysis 116. It should be noted that the order in which these analyses are presented in this section and depicted in the figure in no way implies the order in which these analyses are undertaken. They may be undertaken in any order. In fact, in some embodiments parallel processing techniques may be utilized to perform two or more of these analyses simultaneously.

The output from the statistical spamming analysis module 108 is each mail cluster 118 marked with the probability level that it contains spam. Thus, the clusters themselves are grouped into groupings of either low, medium, or high probability of spam. This information is then sent to an email filtering module 120, which may take action based upon the information. Of course, the form of this action may vary greatly based upon implementation. For example, mail clusters with a high probability of spam may simply be blocked or dropped, or may be placed in a special "spam" or "junk" folder for the user to read at his convenience. Other embodiments may be combined with other spam detection or filtering techniques to further filter mail clusters that, for example, have a medium probability of spam. These other spam detection techniques may be performed in real time, or may be so complex as to take more time than is available for real time. In such situations, the mail clusters with medium possibility of spam may be delayed until further scanning and/or analysis is complete.

Figure 2:
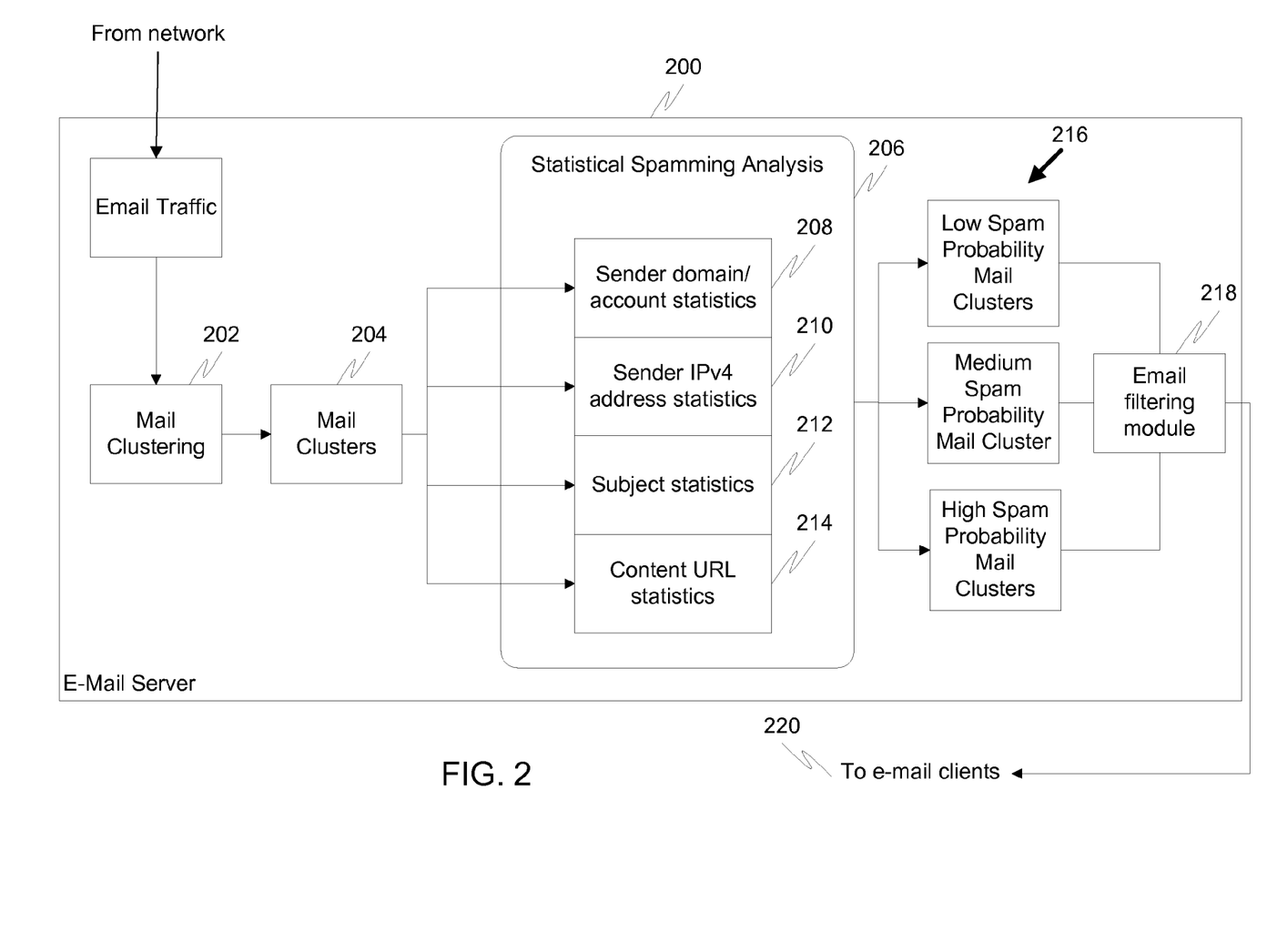
FIG. 2 is a diagram illustrating a system for statistic behavior analysis on mail clusters in accordance with a second embodiment of the present invention.

FIG. 2 is a diagram illustrating a system for statistic behavior analysis on mail clusters in accordance with a second embodiment of the present invention. In this embodiment, email clustering and statistical behavior analysis are performed at or by a mail server 200. The hardware implementation is sufficient to use only commodity PC with 4 GB RAM and the mail server software implementation can be some mail servers in public market, such as Postfix, Sendmail, and Microsoft Exchange. This invention is intended to be implemented as a plug-in module in aforementioned mail servers. Included with or running in conjunction with mail server 200 is a mail clustering module 202 that is designed to cluster real-time email streams arriving at the mail server 200. The output from this mail clustering module 202 is a group a mail clusters 204.

The mail clusters 204 are then passed to a statistical spamming analysis module 206. As described above, this module 206 performs four feature analyses to determine the likelihood that each cluster is spam. The first is sender domain/account statistic analysis 208. The second is sender IPv4 address statistic analysis 210. The third is subject statistic analysis 212. The fourth is content URL statistic analysis 214. It should be noted that the order in which these analyses are presented in this section and depicted in the figure in no way implies the order in which these analyses are undertaken. They may be undertaken in any order. In fact, in some embodiments parallel processing techniques may be utilized to perform two or more of these analyses simultaneously.

The output from the statistical spamming analysis module 208 is each mail cluster 216 marked with the probability level that it contains spam. Thus, the clusters themselves may be grouped into groupings of either low, medium, or high probability of spam. This information is then sent to an email filtering module 218, which may take action based upon the information. As described above, the form this action takes may vary greatly based upon implementation.

E-mail messages from the clusters that have not been blocked are then sent to e-mail clients 220 (such as Outlook).

Locating the mail clustering module and the statistical spamming analysis module closer to the client, such as in the first embodiment, tends to result in reduced effectiveness as far as blocking spam. This is because spammers tend to send e-mail messages to large numbers of users simultaneously, and thus the amount of spam received from a spammer at any one client computer is miniscule in comparison to the amount received at a mail server. Furthermore, the more users the device where the modules are located services, the greater the effectiveness as the sample size of potential spam goes up. As such, the mail server embodiment of FIG. 2 would likely be more effective than that of FIG. 1 because of the larger number of users it services. Despite this increase in effectiveness, where to place the modules still can be a complex question, because the more users (and thus e-mail messages) the device where the modules are located services, the more processing power and resources are necessary to perform its functions. Indeed, at a certain point processing power and resources are so taxed that the ability to perform the processes in real-time is compromised. The administrator will likely take all of these factors into account when deciding where to perform the mail clustering and statistical spamming analysis. The system may be run on, for example, a Dual-processor x86 machine with 2-4 GB memory, commodity networking hardware (fast Ethernet or gigabit Ethernet), and a commodity IDE hard drive.

In a third embodiment of the present invention, information regarding clusters' spam analysis may be shared between devices in a network. For example, if a particular cluster is deemed to likely contain spam, this information along with information about the cluster itself (e.g., the common trait shared by e-mail messages in the cluster, the differences in the feature data, the results of the analysis, etc.) is passed to other devices in the network. This allows the other devices to gain the benefit of the analysis. This enables a "collaborative"-type approach to spam filtering that can help to increase effectiveness. The other devices to which the information is passed may include mail client software and/or mail servers, for example.

System Process

As described above, the software and/or hardware that performs mail clustering and statistical spamming analysis may be located in many different possible locations. Wherever these modules are located, however, they should have the ability to receive and send email communications.

Figure 3:
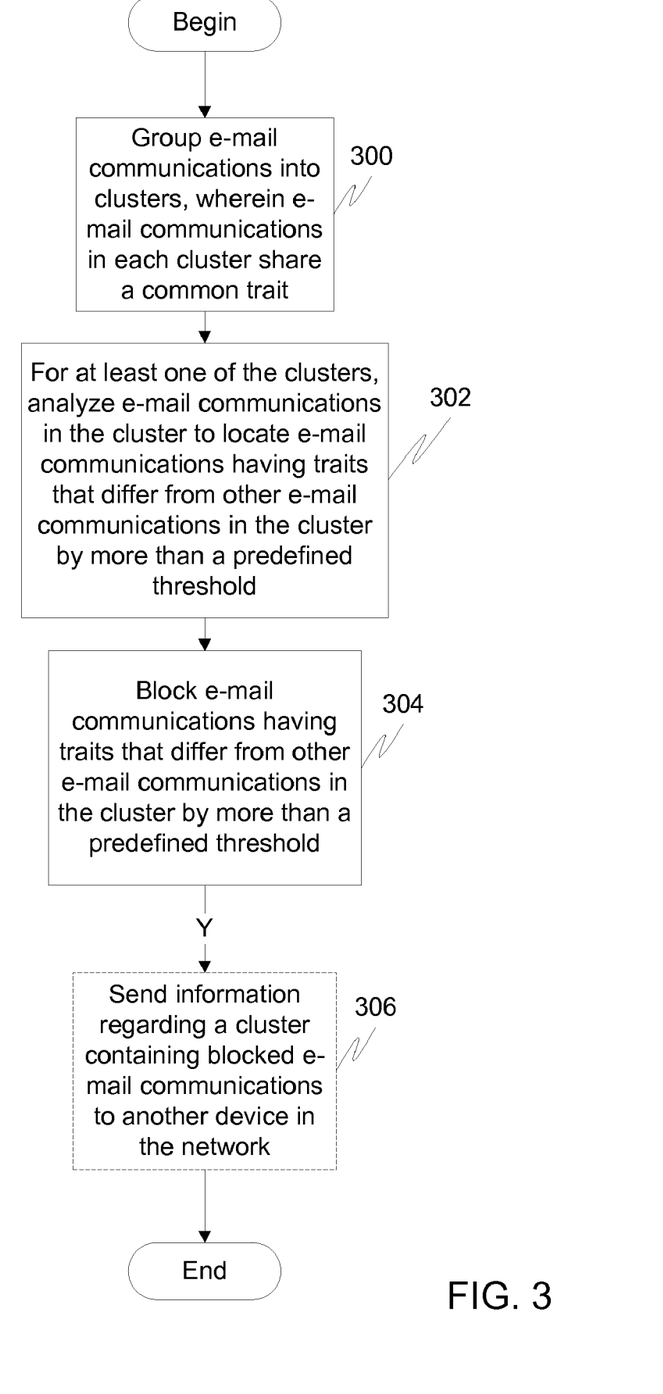
FIG. 3 is a flow diagram illustrating a method of handling a plurality of e-mail messages in accordance with a third embodiment of the present invention.

FIG. 3 is a flow diagram illustrating a method of handling a plurality of e-mail messages in accordance with an embodiment of the present invention. At 300, the e-mail messages are grouped intro clusters, wherein e-mail messages in each cluster share a common trait. At 302, for at least one of the clusters, e-mail messages in the cluster are analyzed to locate e-mail messages having features that differ from other e-mail messages in the cluster by more than a predefined threshold. These features may include, for example, sender domain, subject, source network address, and embedded links. At 304, for the cluster, e-mail messages having features that differ from other e-mail messages in the cluster by more than a predefined threshold are blocked. At 306, information regarding a cluster containing blocked e-mail messages is optionally sent to another device in the network.

Figure 4:
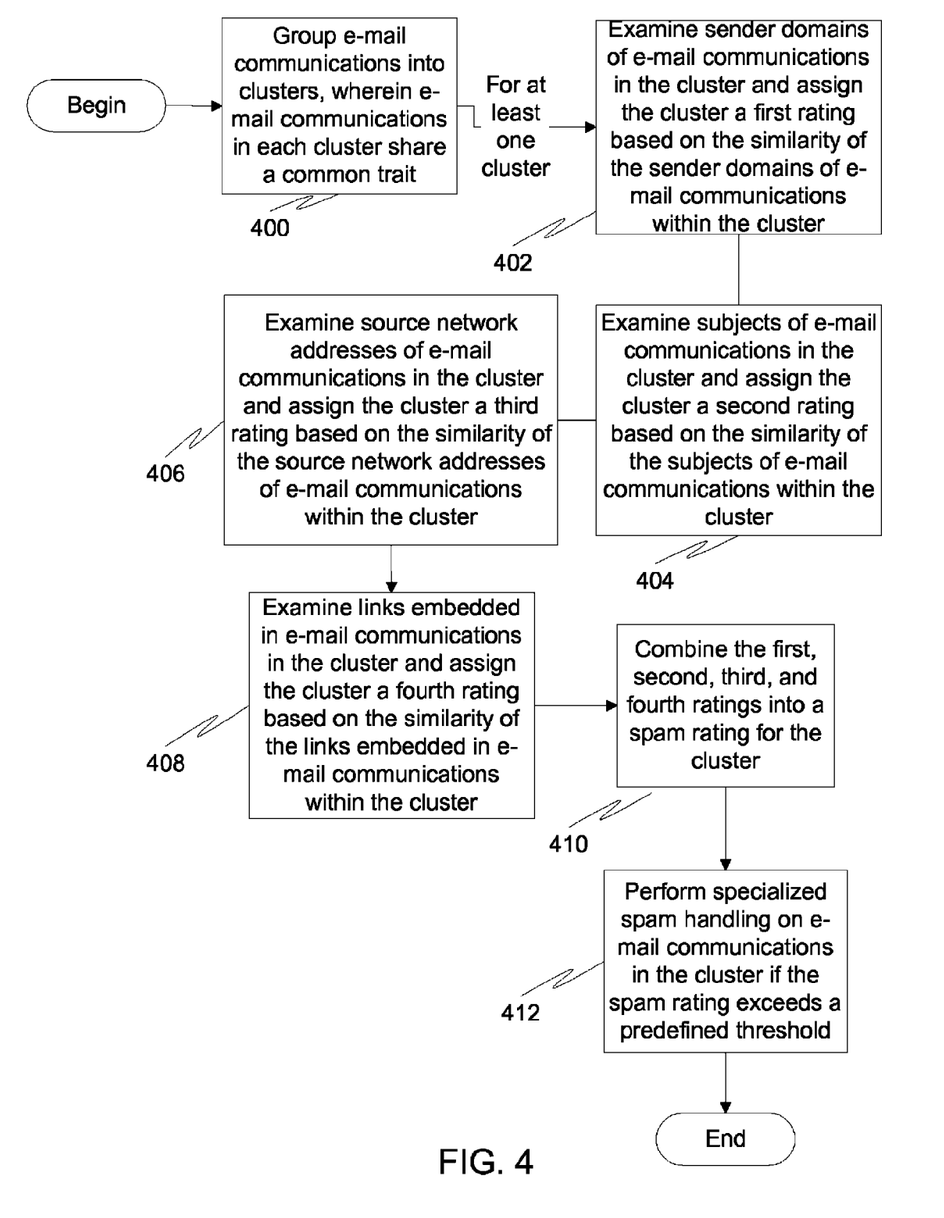
FIG. 4 is a flow diagram illustrating a method of handling a plurality of e-mail messages in accordance with a fourth embodiment of the present invention.

FIG. 4 is a flow diagram illustrating a method of handling a plurality of e-mail messages in accordance with a fifth embodiment of the present invention. At 400, the e-mail messages are grouped into clusters, wherein e-mail messages in each cluster share a common trait. For at least one of the clusters, steps 402-410 are executed. At 402, the sender domains of e-mail messages in the cluster are examined and the cluster is assigned a first rating based on the similarity of the sender domains of e-mail messages within the cluster. At 404, the subjects of e-mail messages in the cluster are examined and the cluster is assigned a second rating based on the similarity of the subjects of e-mail messages within the cluster. At 406, source network addresses of e-mail messages in the cluster are examined and the cluster is assigned a third rating based on the similarity of source network addresses of e-mail messages within the cluster. At 408, links embedded in e-mail messages in the cluster are examined and the cluster is assigned a fourth rating based on the similarity of embedded links in the e-mail messages in the cluster. At 410, the first, second, third, and fourth ratings are combined into a spam rating for the cluster. At 412, specialized spam handling is performed on e-mail messages in the cluster if the spam rating exceeds a predefined threshold. This specialized spam handling may be performed on the entire cluster, or may be limited to just the e-mail messages that differ from the norm based on one or more of the examined traits. The specialized spam handling may include, for example, blocking or filtering the e-mail messages, or moving the e-mail messages in question to a junk folder.

Computer System Embodiment

Figure 5A:
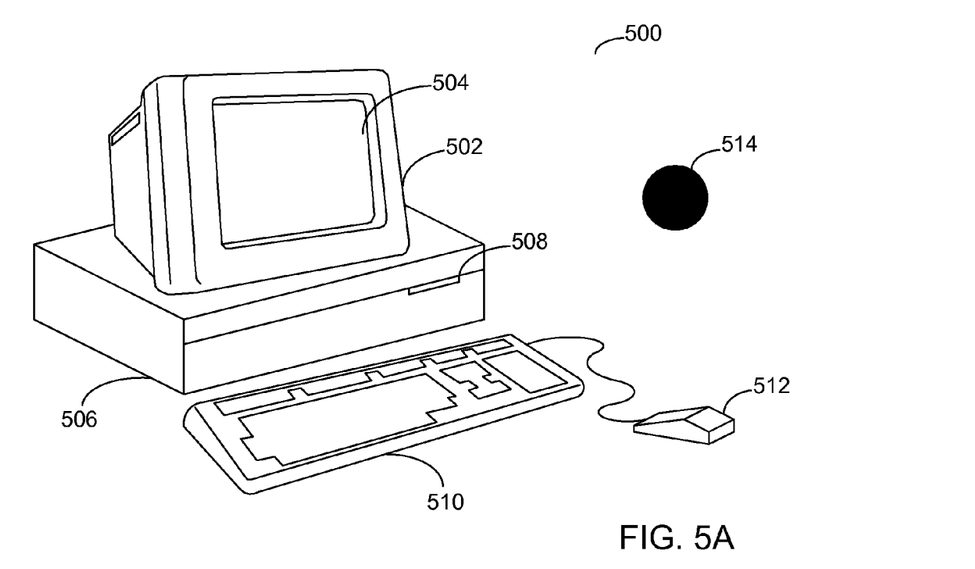
FIGS. 5A and 5B illustrate a computer system suitable for implementing embodiments of the present invention.
Figure 5B:
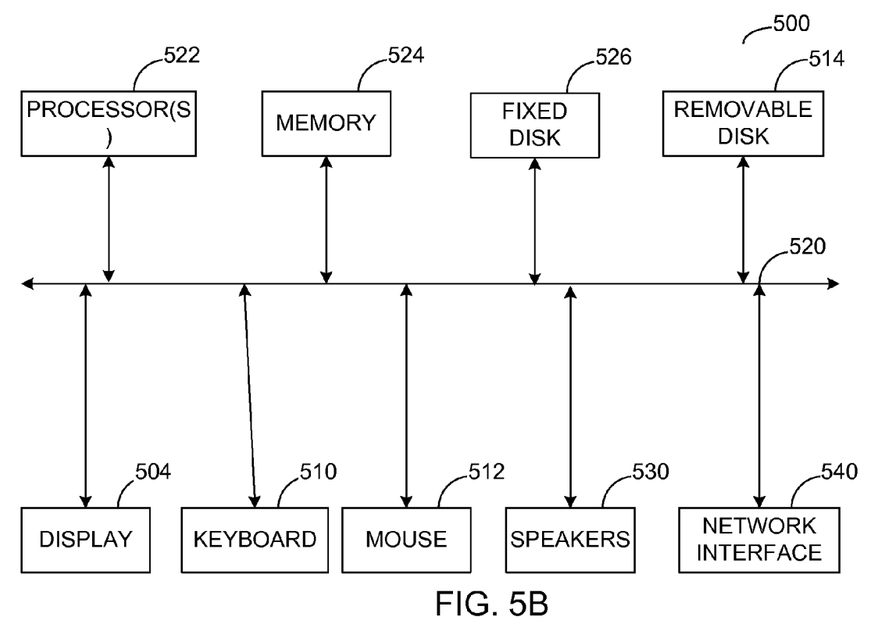

FIGS. 5A and 5B illustrate a computer system 500 suitable for implementing embodiments of the present invention. The email clustering module and/or statistical spamming analysis module may be located on such a computer system. FIG. 5A shows one possible physical form of the computer system. Of course, the computer system may have many physical forms including an integrated circuit, a printed circuit board, a small handheld device (such as a mobile telephone or PDA), a personal computer or a super computer. Computer system 500 includes a monitor 502, a display 504, a housing 506, a disk drive 508, a keyboard 510 and a mouse 512. Disk 514 is a computer-readable medium used to transfer data to and from computer system 500.

FIG. 5B is an example of a block diagram for computer system 500. Attached to system bus 520 are a wide variety of subsystems. Processor(s) 522 (also referred to as central processing units, or CPUs) are coupled to storage devices including memory 524. Memory 524 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 526 is also coupled bi-directionally to CPU 522; it provides additional data storage capacity and may also include any of the computer-readable media described below. Fixed disk 526 may be used to store programs, data and the like and is typically a secondary storage medium (such as a hard disk) that is slower than primary storage. It will be appreciated that the information retained within fixed disk 526, may, in appropriate cases, be incorporated in standard fashion as virtual memory in memory 524. Removable disk 514 may take the form of any of the computer-readable media described below.

CPU 522 is also coupled to a variety of input/output devices such as display 604, keyboard 510, mouse 512 and speakers 530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 522 optionally may be coupled to another computer or telecommunications network using network interface 540. With such a network interface, it is contemplated that the CPU might receive information from the network, or might output information to the network in the course of performing the above-described method steps. Furthermore, method embodiments of the present invention may execute solely upon CPU 522 or may execute over a network such as the Internet in conjunction with a remote CPU that shares a portion of the processing.

Program Storage Device Embodiment

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of handling a plurality of e-mail messages, the method comprising:

receiving a plurality of e-mail messages at a device within a computer network;

grouping the received e-mail messages into clusters, wherein e-mail messages in each cluster share a common trait, wherein the grouping includes parsing bodies of the received e-mail messages to extract traits and applying the extracted traits to group emails having common traits; and after the received e-mail messages have all been grouped, for at least one of the clusters, examining the sender domain of all e-mail messages in the cluster and assigning a first rating to the cluster based on the similarity of the sender domains of e-mail messages within the cluster;

examining the subjects of all e-mail messages in the cluster and assigning a second rating to the cluster based on the similarity of the subjects of e-mail messages within the cluster;

examining source network addresses of all e-mail messages in the cluster and assigning a third rating to the cluster based on the similarity of source network addresses of e-mail messages within the cluster;

examining links embedded in all the e-mail messages in the cluster and assigning a fourth rating to the cluster based on the similarity of embedded links in the e-mail messages in the cluster;

combining the first, second, third, and fourth ratings into a spam rating for the cluster; and performing specialized spam handling of all e-mail messages in the cluster if the spam rating exceeds a predefined threshold.

2. The method of claim 1, wherein the specialized spam handling includes blocking e-mail messages in the cluster.

3. The method of claim 1, wherein the specialized spam handling includes placing e-mail messages in the cluster into a junk folder.

4. The method of claim 1, wherein said device is a user computer and the method is executed at or on client e-mail software on the user computer.

5. The method of claim 4, further comprising:
sending the spam rating of said cluster whose spam rating exceeds said predefined threshold along with information regarding the corresponding cluster to another client e-mail software in said computer network.

6. The method of claim 4, further comprising:
sending the spam rating of said cluster whose spam rating exceeds said predefined threshold along with information regarding the corresponding cluster to an e-mail server in said computer network.

7. The method of claim 1, wherein the device is an e-mail server and the method is executed on said e-mail server.

8. The method of claim 7, further comprising:
sending the spam rating of said cluster whose spam rating exceeds said predefined threshold along with information regarding the corresponding cluster to another e-mail server in said computer network.

9. A system comprising:
a plurality of e-mail clients residing on user computers;
an e-mail server communicatively coupled to the plurality of e-mail clients, wherein the e-mail-server contains a processor designed to handle e-mail communications;
an e-mail clustering module operating on a device with a processor arranged to cluster incoming e-mail messages into clusters based upon a common trait; and
a statistical spamming analysis module operating on a device with a processor arranged to:
group the incoming e-mail messages into clusters, wherein e-mail messages in each cluster share a common trait, wherein the grouping includes parsing bodies of the incoming e-mail messages to extract traits and applying the extracted traits to group emails having common traits; and
after the incoming e-mail messages have all been grouped, for at least one of the clusters examine the sender domain of all e-mail messages in the cluster and assigning a first rating to the cluster based on the similarity of the sender domains of e-mail messages within the cluster;

examine the subjects of all e-mail messages in the cluster and assigning a second rating to the cluster based on the similarity of the subjects of e-mail messages within the cluster;

examine source network addresses of all e-mail messages in the cluster and assigning a third rating to the cluster based on the similarity of source network addresses of e-mail messages within the cluster;

examine links embedded in all the e-mail messages in the cluster and assigning a fourth rating to the cluster based on the similarity of embedded links in the e-mail messages in the cluster;

combine the first, second, third, and fourth ratings into a spam rating for the cluster; and perform specialized spam handling of all e-mail messages in the cluster if the spam rating exceeds a predefined threshold.

10. The system of claim 9, wherein the e-mail clustering module and statistical spamming analysis module are located on one or more of the plurality of e-mail clients.

11. The system of claim 9, wherein the e-mail clustering module and statistical spamming analysis module are located on the e-mail server.

12. The method of claim 1, wherein the more different the sender domains of the e-mail messages, the higher the first rating, therefore making the spam rating higher.

13. The method of claim 12, wherein the more different the subjects of the e-mail messages, the higher the second rating, therefore making the spam rating higher.

14. The method of claim 13, wherein the more different the source network addresses of the e-mail messages, the higher the third rating, therefore making the spam rating higher.

15. The method of claim 14, wherein the more different the links embedded in the e-mail messages, the higher the fourth rating, therefore making the spam rating higher.

16. The method of claim 1, further comprising:
applying a different weight to each of the first, second, third, and fourth ratings so that the combining of the ratings takes into account the different weights.

17. The method of claim 1, wherein the third rating includes an adjustment based on the number of countries the plurality e-mails in the cluster were sent from.

18. The method of claim 1, wherein the plurality of e-mail messages are received as part of a real-time e-mail stream.

19. The method of claim 18, wherein the real-time e-mail stream is received from a spam honeynet.

20. The method of claim 18, wherein the real-time e-mail stream is received as Simple Mail Transport Protocol (SMTP) traffic from an enterprise source.

21. The system of claim 9, wherein the incoming e-mail messages are received as part of a real-time e-mail stream from a spam honeynet.

* * * * *